Jan. 20, 1931. T. G. O. HYDEN ET AL 1,789,818
METHOD AND APPARATUS FOR MANUFACTURING PIPES
AND LIKE HOLLOW ARTICLES
Filed Feb. 29, 1928    2 Sheets-Sheet 1
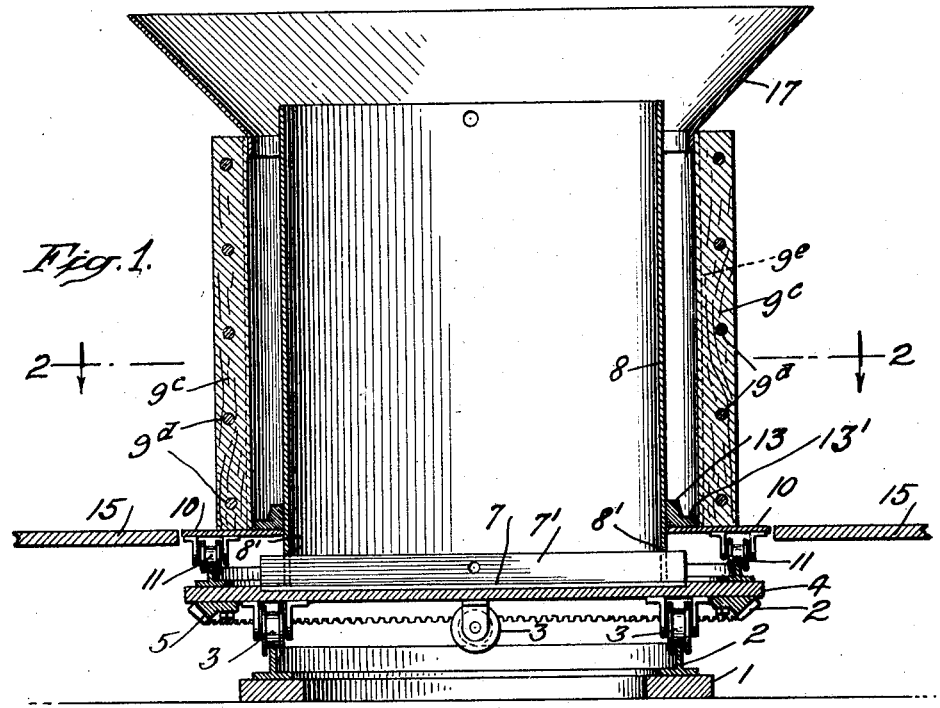
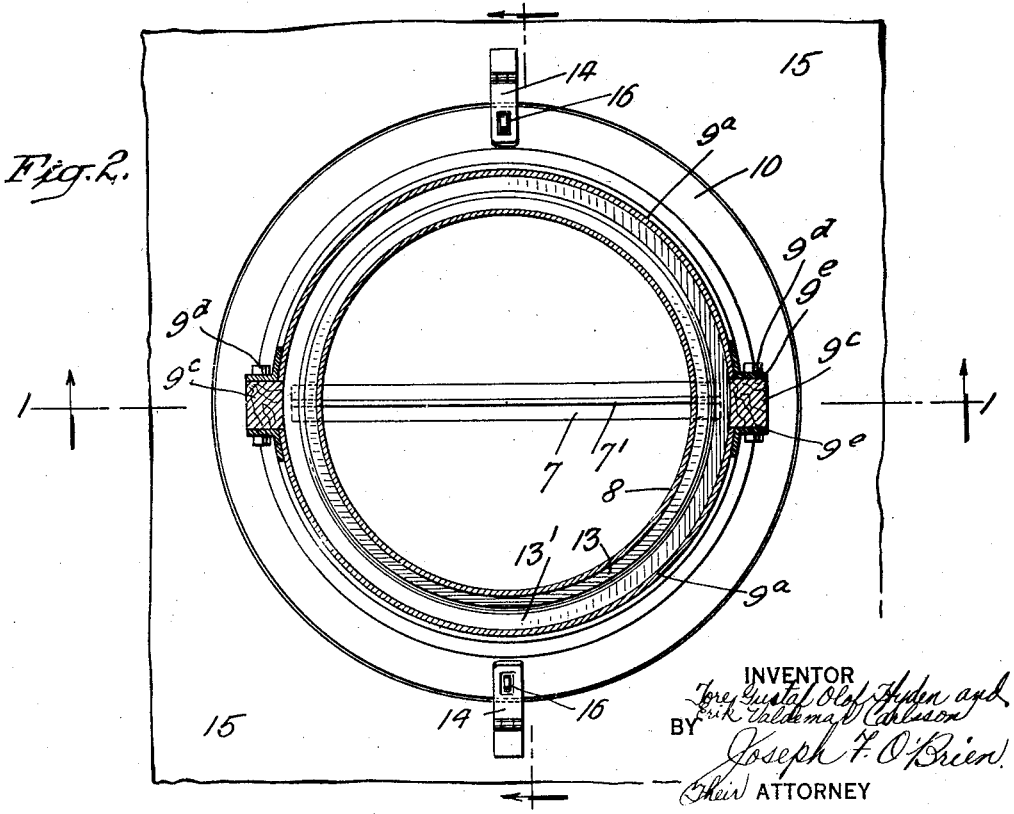
INVENTOR
Tore Gustaf Olof Hyden and
Erik Valdemar Carlsson
BY Joseph F. O'Brien
Their ATTORNEY

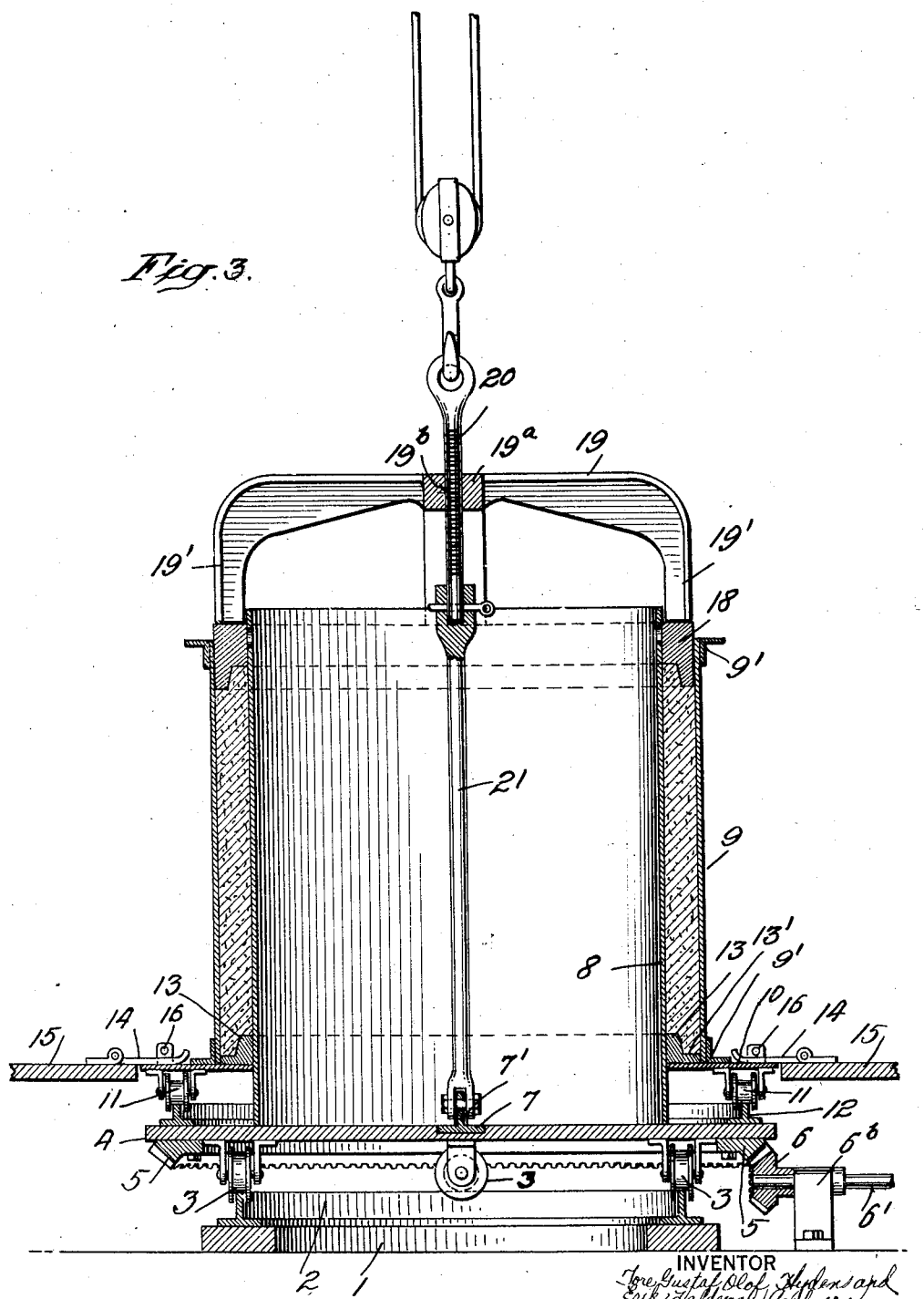

Patented Jan. 20, 1931

1,789,818

UNITED STATES PATENT OFFICE

TORE GUSTAF OLOF HYDEN, OF STOCKHOLM, AND ERIK VALDEMAR CARLSSON, OF NYKOPING, SWEDEN

METHOD AND APPARATUS FOR MANUFACTURING PIPES AND LIKE HOLLOW ARTICLES

Application filed February 29, 1928. Serial No. 257,927.

This invention relates to improvements in method and apparatus for manufacturing pipes and like hollow articles.

One of the objects of this invention is to manufacture from plastic material, such as cement concrete, pipes or like hollow articles by the use of a method in which the plastic material will be introduced into a vertical mold, first subjected to the frictional mixing and compacting action of a core rotated in contact with the said mass during the filling operation to cause a thorough distribution and packing and mixing of the particles of the mass, and, secondly, the mass is further subjected to endwise pressure applied thereon in a vertical direction to cause a further packing and consolidation thereof.

Another object is to combine either of these steps with the application of centrifugal force to the mass to cause a still further compacting and consolidation thereof and to release excess water therefrom.

Another object of this invention is to enable the manufacture of pipes or hollow articles of larger diameter than is possible by the use of a horizontal mold.

Still another object of my invention is to provide a vertical molding apparatus in which the mold may be readily and quickly filled and in which a smooth core or mandrel will be mounted to permit ready rotation independently of the mold and also a rotation of the core and mold jointly.

Still another object of the invention is to provide simple means by which endwise or vertical pressure may be applied on the mass after filling.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a vertical section on the line 1—1 of Fig. 2, looking in the direction of the arrow;

Fig. 2 is a transverse section on the line 2—2 of Fig. 1, looking in the direction of the arrow; and Fig. 3 is an enlarged section on the line 3—3 of Fig. 2, looking in the direction of the arrow, the mold being shown as filled and pressure being applied thereto.

Referring now to these drawings, which illustrate a preferred embodiment of my invention, 1 indicates a suitable base, which as shown, is in the form of a wooden ring which supports an annular track 2 on which is suitably mounted for rotation on wheels 3 a turn-table 4 which may be rotated in any suitable manner and, as illustrated, is provided with an annular bevel gear 5 which meshes with a bevelled pinion 6 mounted on a power shaft 6' supported in brackets $6^b$ driven from any suitable power not shown. The turn-table 4 has fixed thereto in any suitable way a T-bar or rail 7 which serves as a means for mounting a core 8 in relatively fixed position on the turn-table so as to be rotatable therewith and, as shown, the core is provided on opposite sides with notches 8' which fit over the vertically-disposed rail or flange 7' of the bar 7. A mold 9 is mounted to surround the core 8 and is also preferably rotatably mounted. As illustrated, the mold 9 is mounted on a turn-table 10 comprising an annular ring through which the core extends, said turn-table, as illustrated, being mounted by means of wheels 11 on an annular track 12 supported on the turn-table 4. As illustrated, the mold 9 is spaced from a core 8 a suitable distance and an end ring 13 is inserted which serves as a spacing device for one end of a pipe to be formed in the mold and the mold is reinforced at the top and bottom edges by angle irons 9' and is preferably formed of two arcuate sections $9^a$, $9^a$, connected together through beams $9^c$ by a series of bolts $9^d$ passing through the beams and through flanges $9^e$ on the longitudinal edges of the arcuate sections.

The mold during the filling operation is maintained in a stationary position by fastening devices 14 suitably connected to a stationary structure 15 adapted to engage lugs 16 on the turn-table 10 so as to maintain the same in stationary position. When the parts are mounted as above specified and a funnel-shaped chute 17 is applied, the material is fed through this chute into the space between the mold and core and during all this filling operation the core is rotated at a relatively slow rate of speed so as to subject the mass as it is being filled to a frictional mixing and compacting action which causes an initial distribution of the mass within the space and a compacting thereof. When the mold is filled to the point desired, the filling chute 17 is removed and a forming ring 18 of suitable radius is mounted to cause its inner annular surface to fit closely around the core and its outer periphery to hug the inner surface of the mold and pressure is then evenly applied on this ring preferably by means of a spider 19 having four legs 19' which bear on the ring 18 at four points around the circumference thereof and this spider 19 is forced downwardly preferably by screw-pressure. As shown, a hub 19$^a$ of the spider is provided with a screw-threaded bore 19$^b$ and this screw-threaded bore cooperates with a screw-threaded rod 20 which is connected by a link-bar 21 to the upwardly-extending flange 7' of the rail 7, so that upon a slow turning of the turn-table 4 while the turn-table 10 is retained in stationary position, the spider will be caused to move downwardly and exert pressure on the ring 18 which, in turn, will exert pressure against and cause a compacting of the plastic mass within the space between the mold and the core and this pressure will be so exerted while the core is likewise being rotated in relation to such plastic mass so that during this stage of the process, the plastic mass is not only subjected to the frictional rolling action due to the rotation of the core but is likewise subjected to endwise pressure on the mass and this results in a very thorough compacting of the concrete or plastic material.

For certain classes of pipes, such as sewer pipes, no further operation is necessary and the plastic material in the mold will, when allowed to set and to be cured in the usual way, produce a sewer pipe of high grade having thoroughly compacted walls.

When, however, it is desired to produce a pipe of a still higher grade, we preferably release the turn-table 10 from the fastening devices 14 and then subject the plastic material in the mold to the action of centrifugal force. This is accomplished by rotating the turn-table 4 until it reaches a relatively high rate of speed, say two hundred and fifty (250) revolutions per minute, it being understood that the friction between the plastic mass and the core will be sufficient to carry the mass and mold around with the turn-table 4. When the mass is thus centrifuged, the excess water, being the lightest material, will separate out from the mass and be released therefrom, while the particles of the mass will be subjected to the compacting action of centrifugal force. The excess water thus released from the mass will pass downward between the ring 13 and the surface of the core on to the outer edge of the turn-table 4 from which it may be conducted in any suitable way.

It will be understood from the above that we are enabled to produce a pipe which is not only subjected to a frictional rolling action between the particles themselves and between the mass and the core but also provide means for subjecting the mass to an endwise pressure and also to centrifugal pressure and the result will be a highly compacted pipe which may be applied to any suitable use.

Having described our invention, we claim:—

1. The method of manufacturing pipes and similar hollow articles from plastic material which consists in filling a mass of plastic material into a vertical mold, subjecting said mass to the frictional compacting action of a smooth member rotating at a relatively slow rate of speed during such filling of said mass to cause a distribution and compacting thereof, and thereafter subjecting said mass to a positive and non-yielding endwise pressure.

2. An apparatus for manufacturing pipes and similar hollow articles from plastic material, embodying, in combination, a rotatable turn-table, a core mounted on said turn-table in fixed relationship thereto, a mold surrounding said core and spaced therefrom, means for rotating said turn-table, and means for mounting said mold on said turn-table to permit independent or simultaneous rotation of said core and mold.

3. An apparatus for manufacturing pipes and similar hollow articles from plastic material, embodying, in combination, a rotatable turn-table, a core mounted on said turn-table in fixed relationship thereto, a mold surrounding said core and spaced therefrom, means for rotating said turn-table, means for mounting said mold on said turn-table to permit independent or simultaneous rotation of said core and mold, comprising another turn-table mounted on the primary turn-table and having a mold erected thereon in vertical position spaced from the core, releasable means whereby the primary turn-table may be rotated with the core alone or jointly with the core and mold.

4. An apparatus for manufacturing pipes and similar hollow articles from plastic material embodying, in combination, a rotatable turn-table, a vertically-disposed cylindrical core mounted on said turn-table in fixed relationship thereto, a mold surrounding said core and spaced therefrom, a pressure applying element arranged at the upper end of the molding space, and screw means for applying between said pressure applying element and said turntable a compacting pressure on the mass within said molding space.

5. An apparatus for manufacturing pipes and similar hollow articles from plastic material embodying, in combination, a rotatable turn-table, a vertically-disposed cylindrical core mounted on said turn-table in fixed relationship thereto, a mold surrounding said core and spaced therefrom, screw means for applying endwise pressure on the material within said mold, and means for connecting said screw and turn-table to cause a rotation thereto to apply pressure on the mass.

In witness whereof, we have signed our names to the foregoing specification.

TORE GUSTAF OLOF HYDEN.
ERIK VALDEMAR CARLSSON.